(12) United States Patent
Kusumoto et al.

(10) Patent No.: US 7,996,264 B2
(45) Date of Patent: *Aug. 9, 2011

(54) SYSTEM AND METHOD FOR CONSUMER-SELECTED ADVERTISING AND BRANDING IN INTERACTIVE MEDIA

(75) Inventors: Laura Lee Kusumoto, San Francisco, CA (US); Earl David Sacerdoti, Alamo, CA (US); Leila Janine Sigler, Palomar Park, CA (US); Sonya Lee Sigler, San Carlos, CA (US)

(73) Assignee: Avatizing, LLC, Paomar Park, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/267,145

(22) Filed: Nov. 7, 2008

(65) Prior Publication Data
US 2009/0063283 A1 Mar. 5, 2009

Related U.S. Application Data

(63) Continuation-in-part of application No. 11/128,260, filed on May 13, 2005, now Pat. No. 7,797,168, which is a continuation-in-part of application No. 09/675,958, filed on Sep. 29, 2000, now Pat. No. 6,954,728.

(60) Provisional application No. 60/204,179, filed on May 15, 2000.

(51) Int. Cl.
*G06Q 30/00* (2006.01)
(52) U.S. Cl. .................................. 705/14.16
(58) Field of Classification Search .................. 705/1.1, 705/14.4
See application file for complete search history.

(56) References Cited

U.S. PATENT DOCUMENTS

| 5,287,268 | A | * | 2/1994 | McCarthy ................. 705/14.17 |
| 5,297,249 | A | | 3/1994 | Bernstein et al. |
| 5,347,632 | A | | 9/1994 | Filepp et al. |
| 5,395,243 | A | | 3/1995 | Lubin et al. |
| 5,481,666 | A | | 1/1996 | Nguyen et al. |
| 5,572,643 | A | | 11/1996 | Judson |

(Continued)

FOREIGN PATENT DOCUMENTS
JP 2001147881 5/2001
(Continued)

OTHER PUBLICATIONS www.avaterra.com, retrieved from Internet Archive Wayback Machine <www.archive.org>, page range Nov. 29, 1999-May 12, 2000.*

(Continued)

*Primary Examiner* — Jonathan Ouellette
(74) *Attorney, Agent, or Firm* — Albrecht Tousi & Farnum PLLC; Ralph P. Albrecht

(57) ABSTRACT

A user of an interactive medium may select advertising for display on the user's avatar, property, or other user-associated environment. The invention presents one or more advertisements to the user and allows the user to select at least one advertisement to display. The user may also choose a location for displaying the selected advertisement. The invention presents the selected advertisement to other users of the interactive medium. The invention tracks these presentations or displays and rewards the original user based on the presentation. The tracking data may also be used to bill the advertiser or optimize the process of selecting and displaying advertisements.

35 Claims, 10 Drawing Sheets

U.S. PATENT DOCUMENTS

| | | | |
|---|---|---|---|
| 5,625,781 A | | 4/1997 | Cline et al. |
| 5,682,511 A | | 10/1997 | Sposato et al. |
| 5,959,623 A | | 9/1999 | Van Hoff et al. |
| 6,023,270 A | * | 2/2000 | Brush et al. ............... 715/741 |
| 6,036,601 A | * | 3/2000 | Heckel ...................... 463/42 |
| 6,329,994 B1 | * | 12/2001 | Gever et al. ............... 345/473 |
| 6,804,659 B1 | | 10/2004 | Graham et al. |
| 6,842,767 B1 | | 1/2005 | Partovi et al. |
| 6,847,969 B1 | | 1/2005 | Mathai et al. |
| 6,981,220 B2 | | 12/2005 | Matsuda |
| 2001/0034661 A1 | * | 10/2001 | Ferreira ................... 705/26 |

FOREIGN PATENT DOCUMENTS

| | | | |
|---|---|---|---|
| JP | 2001147881 A | | 5/2001 |
| JP | 2001147881 A | * | 5/2001 |
| WO | WO 01/88803 A2 | | 11/2001 |

OTHER PUBLICATIONS

Riedman, Pat, "Avatars build character on 3-D chat sites," Advertising Age, p. 40, Sep. 9, 1996.*

"Fujitsu 2: WorldsAway Avatar Communities by Fujitsu Expand Onto the Internet; Fujitsu Launches Wed Services after Explosive Growth on CompuServe," Business Wire, Oct. 23, 1997.*

"CommerceCity Virtual World Changin the Face of Online Shopping; New Web Site Combines e-Commerce With 'Virtuality'," PR Newswire, Jan. 21, 1999.*

"Avaterra.com Premieres At Web Marketing conference; Demostrates New Interface for Web Advertisements," Business Wire, Jun. 17, 1999.*

"Interactive Gaming and Communications Corp. (IGC) Provides Co-Branded Play For Fun Casino Game Site to Lycos." PR Newswire, p. 1841, Nov. 23, 1999.*

"World.com Reports Initial Advertising, E-commerce Results From Freeserve, UK's Leading ISP." PR Newswire, Apr. 7, 2000.*

Elkin, Tobi, "What Is There?", <http://www.there.com> last visited Aug. 17, 2004 at 9:31 p.m., pp. 2 pgs.

"Adaboy,", http://www.adaboy.com, NY-Pittsburg-LA, 622 Second Avenue Pittsburg, PA 15219, 2 pgs., Undated advertising brochure based on U.S. Patent No. 6,036,601.

IDGA "2004 Persistent Worlds Whitepaper" 2004 pp. 1-82.

Tessa Wegert, "Gaming 101" Sep. 22, 2005, pp. 1-2.

Betsy Book, "'These bodies are Free, so get one Now!": Advertising & Branding in Social Virtual Worlds' Apr. 2004, pp. 1-30.

Kevin J. Delaney and Robert A. Guth "Beep. Foosh. Buy Me. Pow. Nielsen's Plans a New Service to Assess Audiences for Ads in Hit Videogame Medium" Wall Street Journal, Apr. 8, 2004.

Nancy Coltun Webster "Now down to business: Counting gamer thumbs; Billion-dollar question: How to measure with TV, print models' accuracy?(Special Report Interactive: Games)" Advertising Age, May 24, 2004.

Erin White "Advertisers, Teens Hang Out Online At the Habbo Hotel" Wall Street Journal, May 7, 2004.

Elkin, Tobi, "What Is There?", <http://www.there.com> last visited Aug. 17, 2004 at 9:31 p.m., pp. 2 pgs.

"Adaboy,", http://www.adaboy.com. NY-Pittsburg-LA, 622 Second Avenue Pittsburg, PA 15219, 2 pgs., Undated advertising brochure based on U.S. Patent No. 6,036,601.

Avaterra.com Premiers At Web Marketing Conference; Demonstrates New Interface for Web Advertisements:, Business Wire, Jun. 17, 1999.

Interactive Gaming and Communications Corp. (IGC) Provides Co-Branded Play For Fun Casino Games-Sitetos Lycos:, PR Newswire, 1841, Nov. 23, 1999.

"World.Com Reports Initial Advertising, E-Commerce Results from Freeserve, UK's Leading ISP" PR Newswire, Apr. 7, 2000.

Riedman, Pat, "Avatars build character on 3-D chat sites," Advertising Age, p. 40, Sep. 9, 1996.

Fujitsu 2: WorldsAway Avatar Communities by Fujitsu Expand Onto the Internet, Fujitsu Launches Web Services after Explosive Growth on CompuServe, Business Wire, Oct. 23, 1997.

CommerceCity Virtual World Changing the Face of Online Shopping; New Web Site Combines e-Commerce with Virtuality, PR Newswire, Jan. 21, 1999.

* cited by examiner

| CUSTOMER ID | LAST NAME | FIRST NAME | E-MAIL ADDRESS | ENCRYPTED PASSWORD | LIST OF CURRENT AVATAR IDS | SAVED STATE | EXTERNAL INFO. | EXPERIENCE DATA | AGGREGATE DATA | CONSUMER PROFILE |
|---|---|---|---|---|---|---|---|---|---|---|

DATABASE LAYOUT - CONSUMER DATABASE

FIG. 4A

| ADVERTISEMENT ID | ADVERTISER ID | POINTER TO AD CONTENT | DISPLAY MODE TYPE ID | AD RATE DATA | ADVERTISEMENT PROFILE |
|---|---|---|---|---|---|

DATABASE LAYOUT - ADVERTISEMENT DATABASE

FIG. 4B

| ADVERTISEMENT ID | AVATAR ID | ELAPSED TIME THIS AVATAR | ENVIRONMENT | # OF OTHER EXPOSED AVATARS | # OF NON-PARTICIPATING VIEWERS | TOTAL EXPOSURE TIME | |
|---|---|---|---|---|---|---|---|

DATABASE LAYOUT - PRESENTATION TRACKING DATABASE

SYSTEM AND METHOD FOR CONSUMER-SELECTED ADVERTISING AND BRANDING IN INTERACTIVE MEDIA

CROSS REFERENCE TO RELATED APPLICATIONS

This application is a continuation-in-part of U.S. patent application Ser. No. 11/128,260, filed on May 13, 2005, which is a continuation-in-part of U.S. patent application Ser. No. 09/675,958, filed on Sep. 29, 2000, which claims the benefit of U.S. Provisional Application No. 60/204,179, filed on May 15, 2000, the contents of all of which are incorporated herein by reference in their entireties.

BACKGROUND OF THE INVENTION

In conventional advertising formats, the consumer is a recipient and relatively passive vis-à-vis the advertising. The advertising is in effect pushed or thrust upon a non-voluntary and often indifferent consumer, who may become jaded to the experience and make an effort to ignore the advertising, or consider it part of the background. Even when the advertising is applied to the participant's own avatar in an interactive game (a race car, for example), the participant has no say in what advertising is applied, and no real interest in the issue.

In an increasingly interactive world, advertisers and media outlets are using new venues to sell to and entertain consumers. These venues make use of a wide range of diverse devices. Simultaneously, the increased diversity has empowered consumers by forcing advertisers and media outlets to find new ways to distribute their messages. The interactive nature of the venues provides the basis upon which to build a solution by bringing consumers in as active participants.

SUMMARY OF THE INVENTION

The present invention provides a way for sponsors to promote their brands or otherwise advertise products and services in virtual and real environments such as computer networks and other interactive media such as interactive television and dynamically-modifiable displays, audio messages, streaming video, or other multimedia modalities. The invention provides users with the ability to choose, create, and the like sponsors' logos, names, commercial symbols, advertisements and so on to appear on their avatars, such as in a virtual spaces, on virtual objects or the like within the virtual environments. According to aspects of the invention, the virtual environment includes dynamically modifiable presentations, audio streams, interactive television, etc., as well as dynamically modifiable information sources. The invention provides a mechanism for audience members (consumers) to choose, create, or the like the logo, names, commercial symbols, virtual objects associated or so on with an advertiser, or advertisements that are presented on their avatars, game pieces, game elements such as cards in an online card game, within information sources or the like whose content the consumers may control or influence. Similarly, the invention provides consumers with the ability to choose the advertisements presented to them within audio, streaming video, or other multimedia modalities. The invention also may provide methods for deriving revenue or other rewards from those choices, and may provide mechanisms for tracking, optimizing, and billing for the usage of those logos, names, commercial symbols, advertisements, or the like according to aspects of the methods.

The invention seeks to involve participants more directly in the matter of advertising, to provide incentives for them to adopt and deploy advertising, and to provide a source of revenues based thereon. It resolves or mitigates the conflict between the goals of the user and the advertiser by providing a method of advertising that makes participants in the virtual world willing agents of the advertiser and advertising part of their activities. Participants may include consumers, hosts, vendors, teams, groups or any other variety of users of interactive media.

According to the aspects of the invention, the method for selected advertising using a virtual world operates by providing an advertisement group, concept, campaign or the like to a participant, wherein the advertisement group includes at least one of an advertisement, one or more advertisements of one or more categories, or one or more advertisements of one or more advertisement profiles; receiving a selection of the advertisement group from the participant, where such selection may be the creation of the ad by the participant; when a plurality of locations exists, providing the plurality of locations for the participant to choose to present the advertisement group using the virtual world and receiving a selection of one or more locations from the plurality of locations from the participant; when only one location exists, selecting the location; creating a selected advertisement group from the selection of the advertisement group and either of i) the selection of the one or more locations or ii) the one location; storing the selected advertisement group, the selection of one or more locations; providing for presentation to a user of the selected advertisement group using the virtual world, wherein the users have access to the virtual world; and providing a reward to at least the participant, wherein the reward is based on at least the creating of a selected advertisement group and at least one of the creation, selection, display or response to the advertisement can be tracked. The tracking of data related to the advertisement can then be used to adjust the creation, selection or display systems and methods as well as the reward and billing systems and methods associated with the creation, selection or display processes. Sampling and tracking methods may include advertising on a billboard or 3-D object with linking to a web-based survey, requests made through groups, and the use of survey bots (automated avatars for collecting data, which may be transferred directly to a database, in a virtual world) as examples. The data processing of the tracked information can employ analytical techniques, including but not limited to statistical and predictive modeling methods like multivariate analysis of variance, or average variance extracted (AVE), for nomological, discriminant and convergent validity. The analyzed information, be it in the form of discrete data, trends, or patterns, can then be used either in a manual or, more preferably, an automated system to optimize the desired result of the advertisement. The desired result, in the case of a participant or host, may be to increase participation via the rewards. In the case of a participant, the desired result may be to increase rewards via participation. In the case of an advertiser, the desired result may be to create brand awareness to sell more goods or services in and via the virtual environment.

Accordingly, in one aspect of the invention a machine readable storage medium stores instructions that, when executed by a machine, cause the machine to perform selected advertising within an interactive medium. The instructions include providing an advertisement group, which includes at least one advertisement, to a first user. A selection of at least one advertisement from the advertisement group by the first user is received and used to generate a selected advertisement. The first user may also select one or more locations from a plurality of locations for presenting the selected advertisement. The selected advertisement is presented to at least other user in the interactive medium, and the first user receives a reward based on the presentation of the advertisement. The instructions also generate tracking data that can be used for billing purposes, optimizing the selection of an advertisement, optimizing the selection of at least one location, optimizing the process of creating a selected advertisement, and optimizing the reward process.

The advertisement and the location may be selected using the interactive medium or an ancillary support environment, such as an interface for exchanging information and choices. Examples of an ancillary support environment include electronic mail, web browser, online agent, instant messaging, paging, text messaging, internet resources, video messaging, and short message service. Examples of an interface for exchanging information and choices include a mobile station, a wireless device, user equipment, an internet enabled device, a media player, and a gaming system. A machine may be a processor executing the instructions or a plurality of processors executing the instructions in a distributed manner. Providing a reward may include tracking an interaction with the advertisement and providing a reward to the first user based on that interaction. Examples of an interaction include sharing at least one aspect of the interactive medium using the advertisement, tracking click events and click-through events, and transferring aspects of the interactive medium to another medium. The reward may include coupons, merchandise, credits, goods, services, information about a virtual world, information about real world events, opportunities in a virtual world, virtual money, money, discounted products, discounted services, access to restricted content, contest clues, licensing fees, royalty fees, a benefit in a game, or increased social status.

The machine readable instructions may also include creating a consumer profile, including registration information, environment continuation information, information on the selected advertisement, information on the selected location, and reward information. The interactive medium may include media presented via mobile devices, streaming video, streaming audio, radio, television, voice portal, web site, web meeting, internet resources, internet enabled devices, gaming systems, or an information presentation environment. A location for displaying an advertisement may include a wearable display, a game piece, a game card, a game element, a display controlled or influenced by the first user, a portion of a web page, a portion of a web page for a period of time, a time slot in an audio or video stream, a portion of screen real estate in a video stream, a radio or television broadcast, an on-hold audio message, real world clothing, an electronic billboard, a billboard with a processor-controlled display, a vending machine, programmable paper, a virtual character, a virtual representation of a user, a virtual place, media present in a real-world space, or media projected onto a real-world space. The reward may also be provided to an advertiser or a sponsor. The first user may be charged a fee based on the selected advertisement. Presenting or displaying the advertisement may occur at times and places selected by a user or determined by sensors that provide information indicating a user's actions or a user's location.

The interactive media may include media displayed on interactive television, an electronic bumper sticker, an article of clothing with a flexible screen, a billboard with a processor-controlled display, a mobile telephone, a personal digital assistant, a tablet computer, a mobile station, user equipment, a gaming system, an augmented reality display, a telepresence system, or a videoconference display. The interactive medium may include a collaborative virtual environment, a multi-user virtual environment, a massively multiplayer online game, a virtual world, an interactive themed environment, or an augmented reality system.

The advertisement group may include one or more advertisements in one or more categories. The advertisement may include an image, an audio clip, an animated image, a multimedia movie, a behavior for an object in the interactive medium, an object that confers a benefit in a game, or a multi-user event in the interactive medium. The advertisement may also include a logo, a name, a commercial symbol, a virtual object associated with an advertiser, an audio clip, a video clip, or a banner. The categories may include a type of product, a brand, a vendor, a company, a specific product, products relevant to a specific activity or interest, and advertisements of a specific advertiser.

An advertisement group may include an advertisement profile, which includes multiple advertisements selected from one or more categories. Each advertisement may include an image, an audio clip, an animated image, a multimedia movie, a behavior for an object in the interactive medium, an object that confers a benefit in a game, or a multi-user event in the interactive medium. The categories may include a type of product, a brand, a vendor, a company, a specific product, products relevant to a specific activity or interest, and advertisements of a specific advertiser. Each advertisement may include a logo, a name, a commercial symbol, a virtual object associated with an advertiser, an audio clip, a video clip, or a banner. The advertisement profile may be provided by a user, a host of the interactive medium, or a party commissioned to create the advertisement group (e.g. an advertising agency).

The advertisement may include an advertisement concept or an advertisement campaign within the interactive medium. The reward may include intangible rewards. The first user may create an advertisement in the advertisement group. The reward may be adjusted to incentivize the first user to choose certain options when selecting an advertisement, selecting a location, or creating a selected advertisement. Billing purposes may include billing a host of the interactive medium, billing an advertising agency, and billing a company that is advertising at least one of its products. Certain steps, such as optimizing the selection of an advertisement, optimizing the selection of a location, optimizing the creation of a selected advertisement, and optimizing the giving of a reward, may be automated processes. Automated processes may include statistical processing, artificial intelligence, and predictive analytical techniques.

According to another aspect of the invention, a method for providing selected advertising within an interactive medium includes providing an advertisement group, which includes an advertisement, to a first user and receiving the selection of at least one advertisement from the advertisement group from the first user. The selection generates a selected advertisement. When multiple locations exist, the method provides the locations to the first user to choose a location for presenting the advertisement within the interactive medium, and the method receives a selection of one or more locations from the first user. The method also presents the selected advertisements to another user in the interactive medium and provides a reward to the first user based the presentation. The method tracks the selected advertisement, the presentation of the selected advertisement, and the reward to generate tracking data that can be used for billing purposes, optimizing the selection of an advertisement, optimizing the selection of a location, optimizing the creation of a selected advertisement, or optimizing the reward.

In yet another aspect of the invention, a system for selected advertising within an interactive medium is described. The system includes a means for providing an advertisement group, which includes one or more advertisements, to a first user and a means for receiving the selection of at least one advertisement from the advertisement group from the first user. The selection generates a selected advertisement. When multiple locations exist, the system provides the locations to the first user to choose a location for presenting the advertisement within the interactive medium, and the system receives a selection of one or more locations from the first user. The system also includes means for presenting the selected advertisement to at least one user within the interactive medium and means for providing a reward, based on the presentation of the selected advertisement, to the first user. The system tracks the selected advertisement, the presentation of the selected advertisement, and the reward to generate tracking data that can be used for billing purposes, optimizing the selection of an advertisement, optimizing the selection of a location, optimizing the creation of a selected advertisement, or optimizing the reward.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are incorporated herein and form part of the specification, illustrate aspects of the present invention and, together with the description, further serve to explain the principles of aspects of the invention.

FIGS. 4A, 4B and 4C show the database fields for users, advertisers and transactions, respectively, as used in an aspect of the invention.

Figure 1:
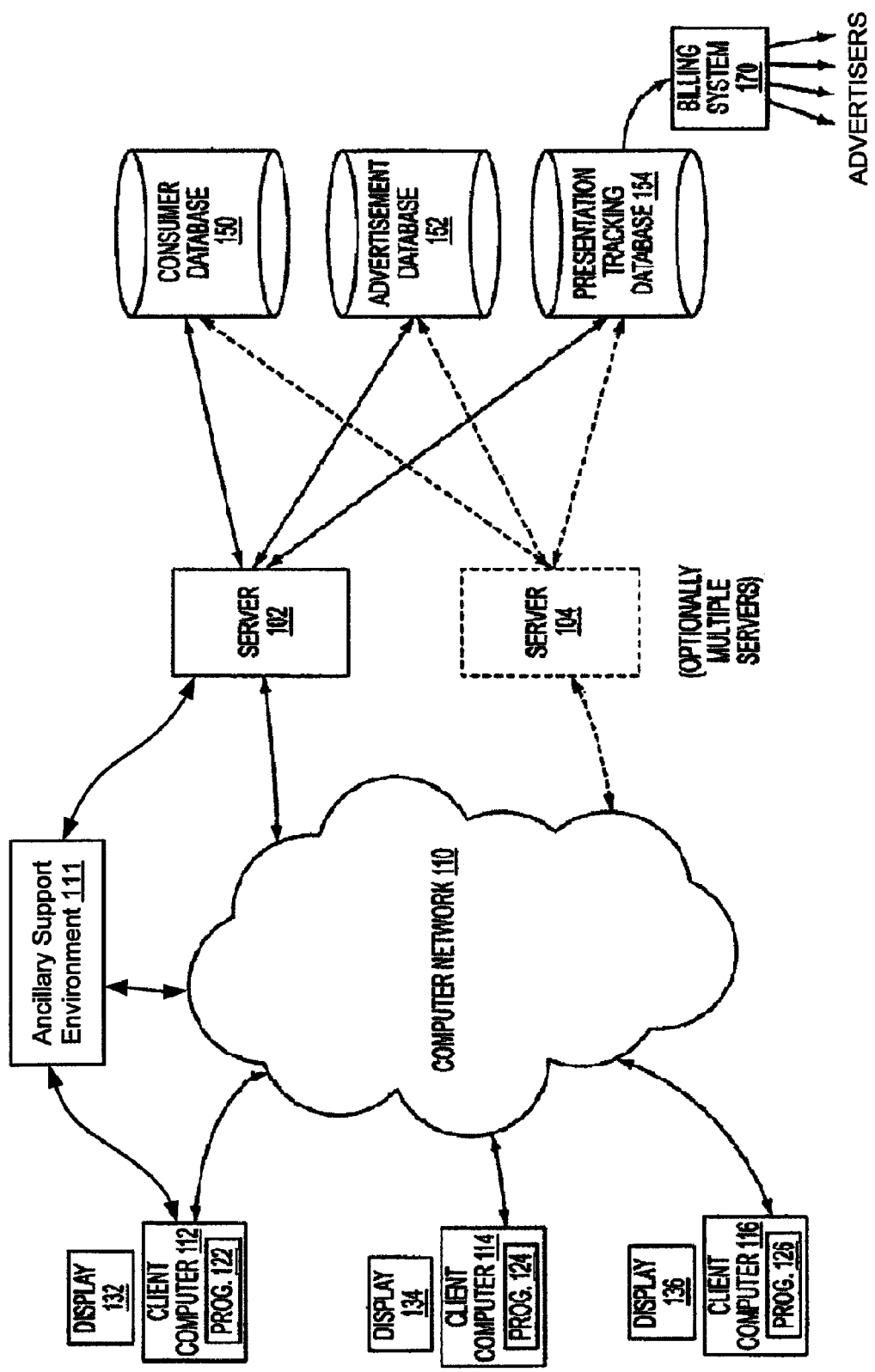
FIG. 1 shows a diagram of the network components, data repositories and their respective interconnections used in one aspect of the invention.

It should be understood that these figures depict aspects of the invention. Variations of these aspects will be apparent to persons skilled in the relevant art(s) based on the teachings contained herein. For example, the flow charts contained in these figures depict particular operational flows. However, the functions and steps contained in these flow charts can be performed in other sequences, as will be apparent to persons skilled in the relevant art(s) based on the teachings contained herein.

DETAILED DESCRIPTION OF THE INVENTION

Many forms of online interactive entertainment immerse participants in a virtual world, which may closely reflect the real world in some respects, but in other respects, a virtual world may dramatically and selectively amplify real world experiences. To personalize the users experience, the concept of "self" must be carried into the virtual environment as well. It is common in such forms of entertainment for each participant to be provided with an "avatar" that represents how the participant's "self" is manifested in the virtual world.

The concept of an "avatar" is used extensively in this application. To better understand how the term "avatar" is used herein, it is helpful to consider how one interacts with the virtual world or how users in the real world view the virtual world, as is described in further detail herein.

As used herein, an "avatar" may be understood to include a graphical object in 2D or 3D, often representing a persona of a user, but not limited to such a representation, appearing within an interactive medium. As the term is used in connection with aspects of the invention (discussed in detail below), an avatar may act under the direct control of the user and provides for interaction with the environment in the user is found. However, it may be pre-programmed or the like by the user to perform certain behaviors, or it could simply perform behaviors, actions, or functions that are hardwired by the system. According to aspects of the invention, an avatar may take on the visual appearance of any living creature in humanoid, animal, plant, mythical, or other form, or it can be an animated depiction of a non-living thing such as a robot, vehicle, weapon, computer, constellation of stars, etc. In alternative aspects, the interactive medium can be viewed on a modifiable display such as an electronic bumper sticker, a tee shirt with a flexible LCD panel, a billboard display, or so on that may be controlled by a computer or other processor, and the avatar can be fashioned to look like an inanimate object or fill a portion of, some part of, or fill the entire display to render one or more advertisements.

According to aspects of the invention, an interactive medium may be implemented using one or more computer networks and the like (known as "networked virtual environment") and other interfaces such as interactive television, interactive media players, mobile stations, wireless devices, internet enabled devices, user equipment (UE), and any future advancement thereof, and the like and the projection of interactive content to an audience. The interactivity provided by certain interfaces, such as interactive television, may be narrower than the interactivity provided by the aspects of the invention. They are not one and the same thing, and the method provides for additional kinds of interactivity among users, advertisers, etc., as are described in detail herein. Thus, one of ordinary skill in the relevant arts would understand that the aspects of the invention provide interactivity while utilizing a greater range of devices as opposed to just television.

As one of ordinary skill would appreciate based at least on the teachings provided herein, the interactivity of the invention provides for the creation, selection and/or presentation of advertisements in various forms through interactive environments. As such, according to aspects of the invention, the interactive nature of aspects of the invention may provide a system that is changeable by a user and responsive to changes by the user, advertisers, or in the virtual world. Also, mobile telephones or other communicating mobile devices such as personal digital assistants, tablet PCs, programmable displays on clothing, automobiles, or other personal or real property, "real-world" virtual environments or the like such as interactive themed environments are also included as interactive media. It is important to note, however, that none of the aspects of the invention require the actual display to be interactive. A "networked virtual environment" implements a virtual world, a 2D or 3D representation or simulation of a physical space. The networked virtual environment may be accessible over a computer network, digital media network or the like by multiple participants, who may interact with the virtual world and with one another in near-real time. Similarly, an "interactive television" may be a conventional television content augmented with interactive facilities, that may be delivered over a digital channel augmented by a back channel to the content broadcaster and by a terminal, other control device or the like. Users and viewers may be able to interact with the content via the control device.

Traditionally, avatars are thought of as representations of people, which are distinct from the rest of an interactive medium, such as a virtual world. This delineation is not required, however, by the aspects of the invention, which goes beyond the classical utilization of avatars. Examples of this are clear from the aspects described herein, such as, but not limited to the application to wearable displays, which may be on tee-shirts, which allow for the avatar to be the display portion of the tee-shirt, and the virtual world to be presented through it to other users. In an early, traditional sense, the avatar usually takes the form, for example, of "first-person" games, where the view of the virtual world is through the eyes of the avatar, as the central acting figure, or a third-person perspective (from the point of view of a third-party avatar or camera watching them). According to these aspects, participants interacting with the virtual environment may view advertisements, or alternatively, the advertisements may be presented to non-participants who are not represented by an avatar in the environment or who may be outside in the real world looking at a display of the virtual world.

The concept of "advertising" is also used throughout this application. For purposes hereof, the term "advertising" is used in a broad sense, and is intended to cover traditional advertisements, as well as the use of "brand marks," which can take the form of a corporate symbol or logo, a trademark, advertising text or copy, a graphical picture, a banner ad on a web page, any visual or auditory multimedia or streaming media element or the like employed for the purposes either of advertising per se, or simply promoting or exposing a product, brand, trademark service mark, and so on. Even when used alone without specific reference to branding and brand marks, the term "advertising" should be understood to refer to the use of such images and indicia as well as to traditional advertising.

According to aspects of the invention, the method may operate to accomplish, but it is not limited to, one or more of the following:

Encouraging positive rather than negative consumer attitudes about advertising by giving the consumers a positive role in the selection of advertising;

Further encouraging consumer adoption and deployment of advertising by providing financial incentives for participants, hosts, or users to adopt and deploy advertising indicia;

Developing advertising pricing models based on such methods of ad deployment;

Developing server pricing models for the consumer based on application of offsetting ad revenues;

Providing a mechanism for the participants, hosts, users, and so on to display advertising for his/her own products, services, or interests;

Developing on-line events, dealings, interactions, or the like based on common chosen sponsorship;

Providing a means for participants, hosts, users and so on to become creative contributors to commercial advertising media;

Providing a means for user-selected or created advertising to be placed on web pages for viewing by the user or by others; and Providing a means for user-selected advertising to become integrated with real world items like clothing, dress, stickers, billboards, posters, vending machines, "programmable paper," media or the like projected onto a real-world space, or any other programmable or dynamically modifiable display or device.

Providing a means for tracking one or more of the creation, selection or display of the advertisement.

Providing a means for analyzing the data from the tracking of one or more of the selection, creation or display of the advertisement.

Providing a means for using the data or the analysis of the data to modify one or more of the creation, selection, or display of the advertisement.

Providing a means for the participant, host or user to access the collected or analyzed data for their use.

Providing a means for modifying the reward for the advertisement based on the collected data or the analysis of the collected data.

Providing a means to employ modeling and predictive analysis on the collected data to automate changes in advertisements.

Providing a means for automatic changes in advertisements to impact the creation, selection, display or reward aspects of the invention. The automatic changes may include shifts in type of advertisement, location of advertisement, transmission method of advertisement, reward system for advertisement and so on.

In further aspects of the invention, the method may collect data on consumer preferences without encountering the resistance to disclosing product and brand preferences commonly expressed by consumers in surveys and the like. Advertisers may be billed or rewarded on a number of bases, including ad exposure, ad response, ad location, ad transmission and the like. The billing or rewarding methods may also be tied to the automated changing of the advertisements.

Recruiting participants who may then use interactive media to advertise to the users, i.e., other participants and viewers, of that medium, may accomplish at least the above described features of the invention. Each user entering or viewing an interactive medium may select from or create at least a set of available advertisements, which may be displayed in the medium. Users may be provided with incentives to do this by the availability of rewards, such as coupons or real or virtual money or other resources, which may be provided by the advertising sponsors, based on adoption of the advertising by the user, as well as on factors such as exposure of the selected advertisements to other users in the virtual world.

By allowing the user, participant, or host to exercise advertising choice, this aspect also facilitates collection of data regarding consumer preferences.

The aspect of the consumer-choice-avatar advertising-method aspect of the invention is illustrated in FIGS. 1-5, and described in the text that follows. Although the following focuses on particular aspects of the invention, the claims appended to this application should not be interpreted as limited by the particular details disclosed in connection with those aspects.

Referring to FIG. 1A the networked virtual environment of one aspect of the invention may be generated on one or more servers 102, 104, etc. distributed over a computer network 110; received by participating consumers' computers 112, 114, 116, etc. by client computer programs 122, 124, 126, etc. (which may be of an animated graphical nature); and displayed on consumers' devices, such as computer displays 132, 134, 136, etc. by those programs. The networked virtual environment may be accessible over the computer network by multiple participants simultaneously.

The environment projected may be the setting for a networked (online) game or other online entertainment activity such as a virtual dance, virtual sporting event, life or fantasy simulation, networked gambling, etc. It may also be an online commerce setting such as a virtual store, virtual shopping mall, virtual town square, or virtual trade show; or it can be an online communications setting such as chat, instant messaging, virtual meetings, virtual rallies, virtual conferences, etc. The host may also allow consumers to merely watch the virtual world on other devices, as described elsewhere herein, such as, for example, billboards, store-front signs, banners, and other public displays, as one of ordinary skill in the art would appreciate based at least on the teachings provided herein.

Alternative aspects of FIG. 1 include the application of automated teller machines (ATM), telephones, smart cards, and other devices, as one of ordinary skill in the relevant art(s) would appreciate based at least on the teachings provided herein, as client computers 112, 114, and 116. In addition, various aspects of the invention may make use of an ancillary support environment 111 within at least program 122, as shown in FIG. 1. In alternative aspects of the invention, the ancillary support environment 111 may, as is indicated in FIG. 1, be implemented on another or more than one platform. In such aspects, the ancillary support environment may operate on more than one client or type of device.

According to an aspect of the invention, the ancillary support environment 111 may provide an interface for the client computer 112 via the computer network 110 to the server 102. The networked virtual environment may be supported by an ancillary support environment (such as ancillary support environment 111 described in greater detail herein) that may have access to one or more distinct networks, such as, but not limited to, computer network 110, in various forms, but is distinct, separate or outside of the virtual world, for example, menus, dialog boxes, control panels or the like provided by client programs such as client program 122, or separately enabled, but interconnected via the computer network 110, or implemented on the server 102. In optional aspects of the invention, the ancillary support environment may be implemented on more than one of these systems. While FIG. 1 describes components of the networked virtual environment to project a setting for a networked game or other online entertainment activity, a virtual world may be implemented in other interactive media such as interactive television. In addition, the ancillary support environment may be implemented using traditional communications media such as telephone, email, a form on a web site, mobile phone, or paper and physical mail, and communicated to the servers using conventional means such as optical character recognition or manual data conversion. Further, the preferences specified in the ancillary support environment may be stored in digital media that are off-line from the network, for example, on a "smart card," and acquired by the networked environment at the time the user accesses the network.

Figure 2A:
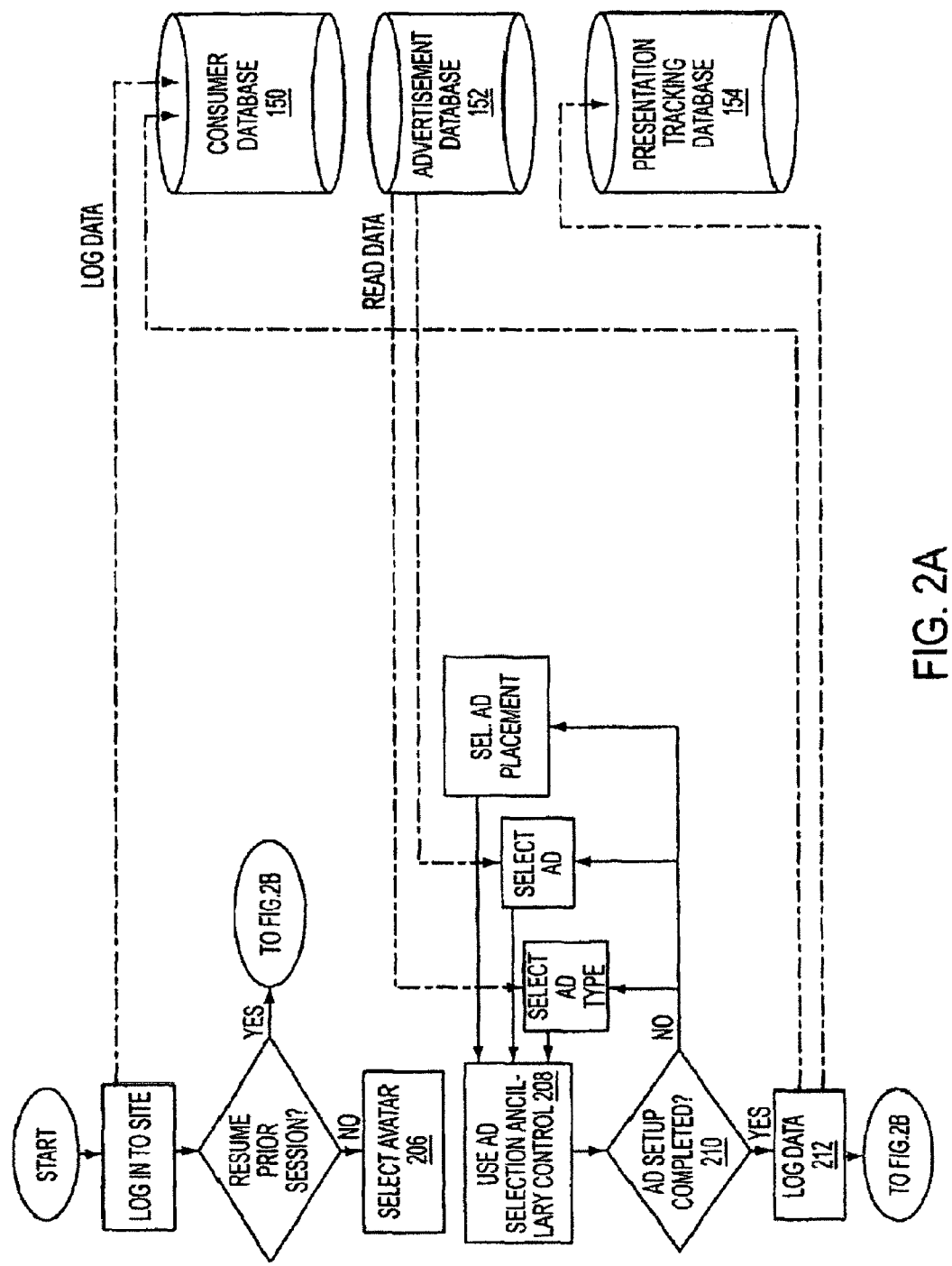
FIGS. 2A-2D show flowcharts illustrating the various operations of the method, according to aspects of the invention.
Figure 2B:
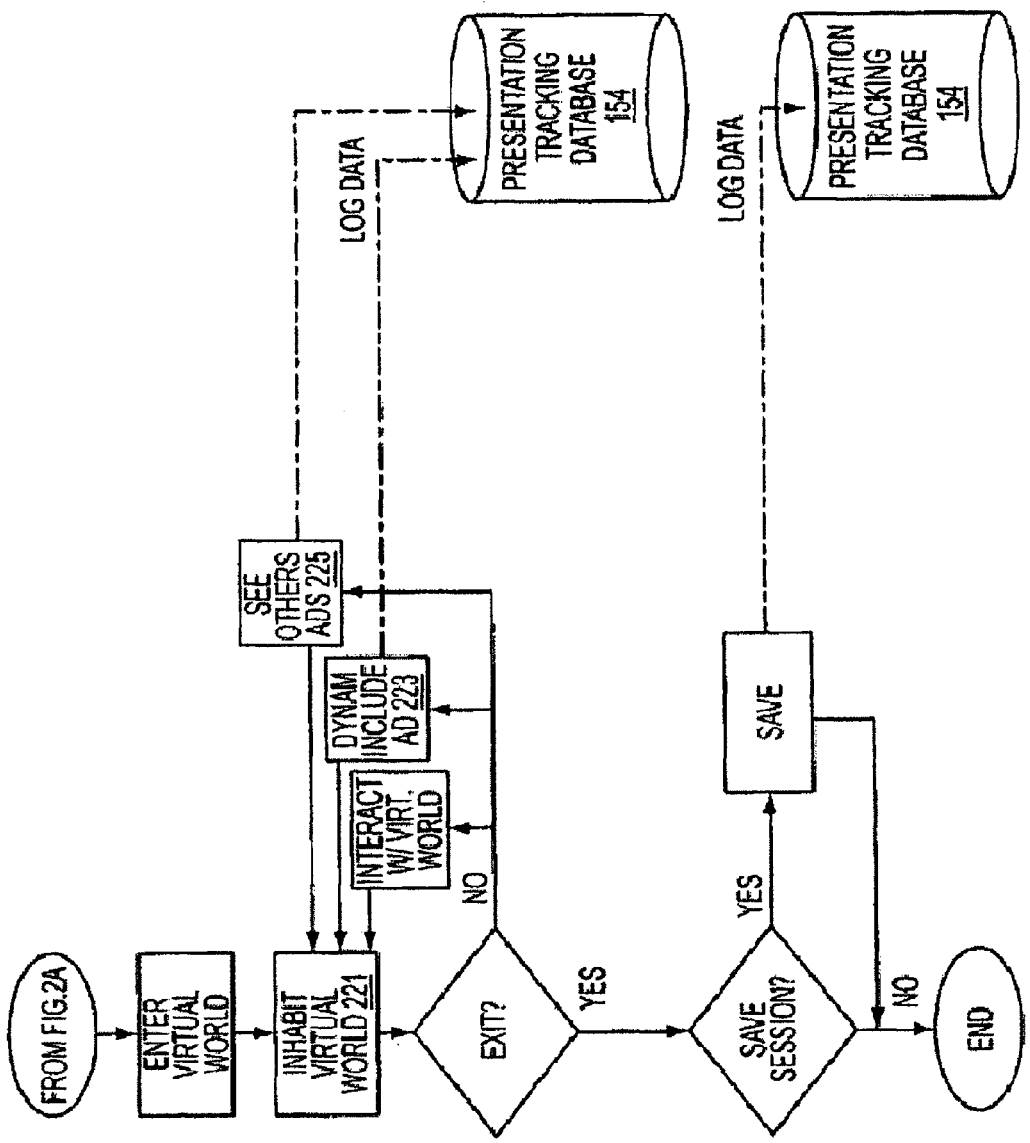

When participating in the virtual world, consumers may be exposed to the images and sounds of their own and other consumers' avatars interacting with one another in the virtual environment. A flow chart depicting a simple course of interaction between a user and this aspect of the invention is shown in FIGS. 2A and 2B. The user selects a presentation location (206), which may be on an avatar or some other location, as described elsewhere herein which the participant may have the ability to select as a location for the advertisement. The advertisement or advertisements may then appear on the object or in the interactive media. This may be permitted within the ancillary support environment, within the virtual environment, or both. When creating or modifying their avatars, users may be presented with multiple choices for the advertisements that may be displayed on the avatars or in the interactive media. The user may select (208) one or more advertisements to appear in parts of the avatars, they may place the advertisements on the avatars.

Figure 3:
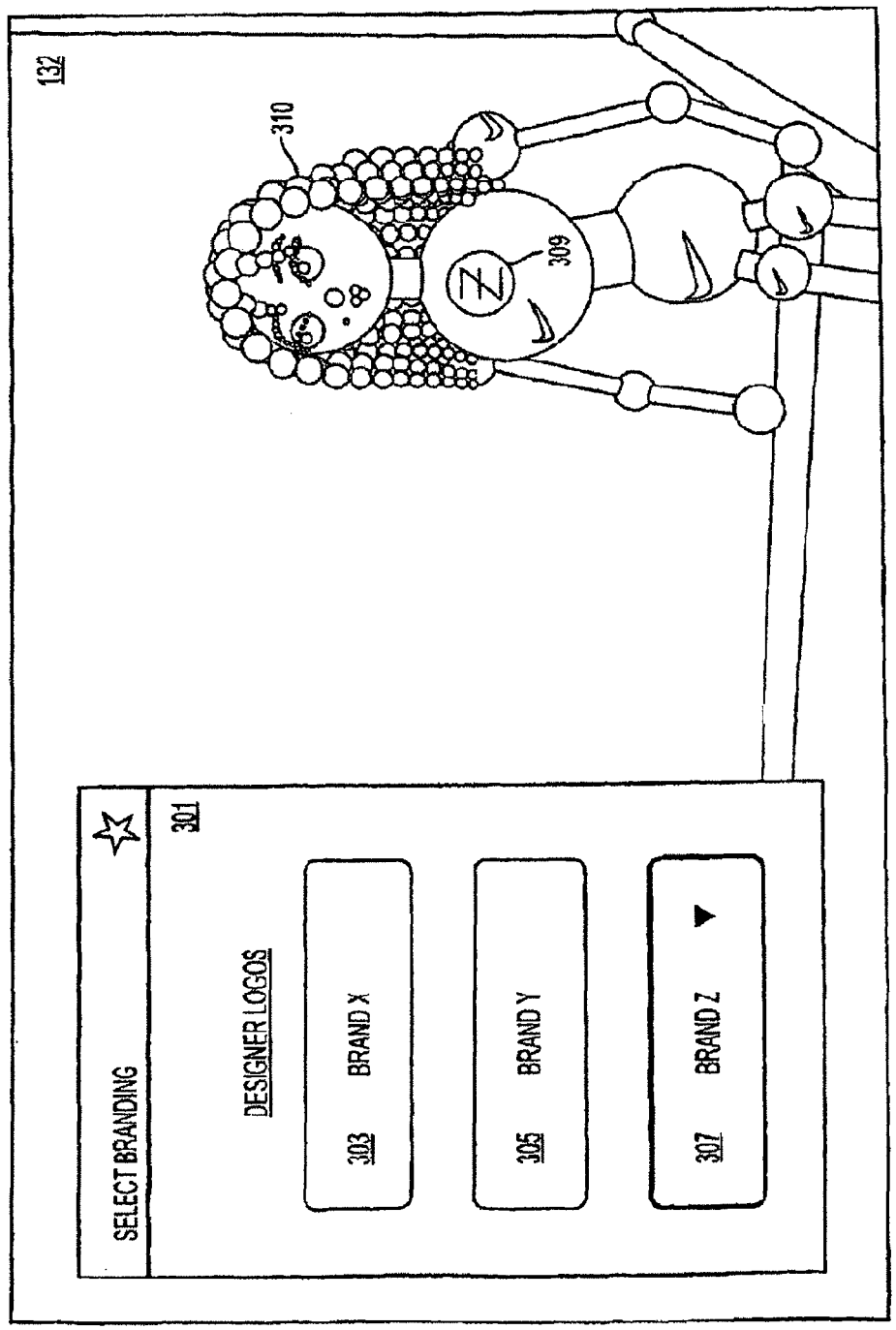
FIG. 3 shows a sample branding selection screen as used in one aspect of the invention.

For example, as shown in FIG. 3, the user may be provided an ancillary dialog box 301 with "Designer Logo" selections 303, 305, 307 (that may read from advertisement database 152 in FIG. 2A for example) that may be selected with a mouse and dragged onto an appropriate location (309) on the clothing of avatar 310. Alternately, the user may find appropriate branded materials in the virtual world, and apply them by taking actions solely in that world. Preferably, the advertisement may be associated with a display mode constraint to require it to be displayed in the specified manner and orientation, and preferably further in a manner that makes its association with the avatar of the consumer who selected the advertisement obvious to most participants.

The advertising selection ancillary control (such as dialog box 301) may also specify how the advertisement may be displayed if selected, the amount of control the consumer may exercise over the time and manner of the display, what rewards may be given to the consumer for displaying each advertisement, and the variables upon which the nature and size of the reward depend. Alternatively, the various aspects of the invention described herein may be determined by software operating on either or both of the server(s) 102, 104. For example, in aspects of the invention, the software may specify how the advertisement may be displayed if selected, the amount of control the consumer may exercise over the time and manner of the display, what rewards may be given to the consumer for displaying each advertisement, and the variables upon which the nature and size of the reward depend.

The user may perform the selection and placement process by using the client computer programs (122, etc. in FIG. 1). When the user indicates s/he is satisfied with the selection (210 in FIG. 2A), the relevant information may be transmitted to the server(s) 102, 104 and stored in consumer database 150 and presentation tracking database 154. Then, whenever the servers cause the avatar representing that user to appear in the networked virtual environment (221), the relevant advertisements may be dynamically included (223) in the presentation of the avatar within the networked virtual environment. Other users whose avatars are nearby in the virtual world thus "see" this advertisement. The user also sees (225) ads placed by other users on or in connection with their avatars. Server(s) 102, 104 may cause the exposure of advertisements in this manner to be logged in databases 150, 154.

One of ordinary skill in the art, based at least on the teachings provided herein, will be able to understand that, according to the aspects of the invention, the information concerning the user's choices in the selection and placement process may alternatively be stored in offline media such as a "smart card" or in the memory of mobile devices such as cell phones. According to aspects of the invention, interactive display devices such as digital billboards, or the electronic display of vending machines may be used to present the advertisements to users. Information concerning this presentation may then be transmitted by the device, or stored in the offline medium for later transmission to server(s) 102, 104.

Figure 2C:
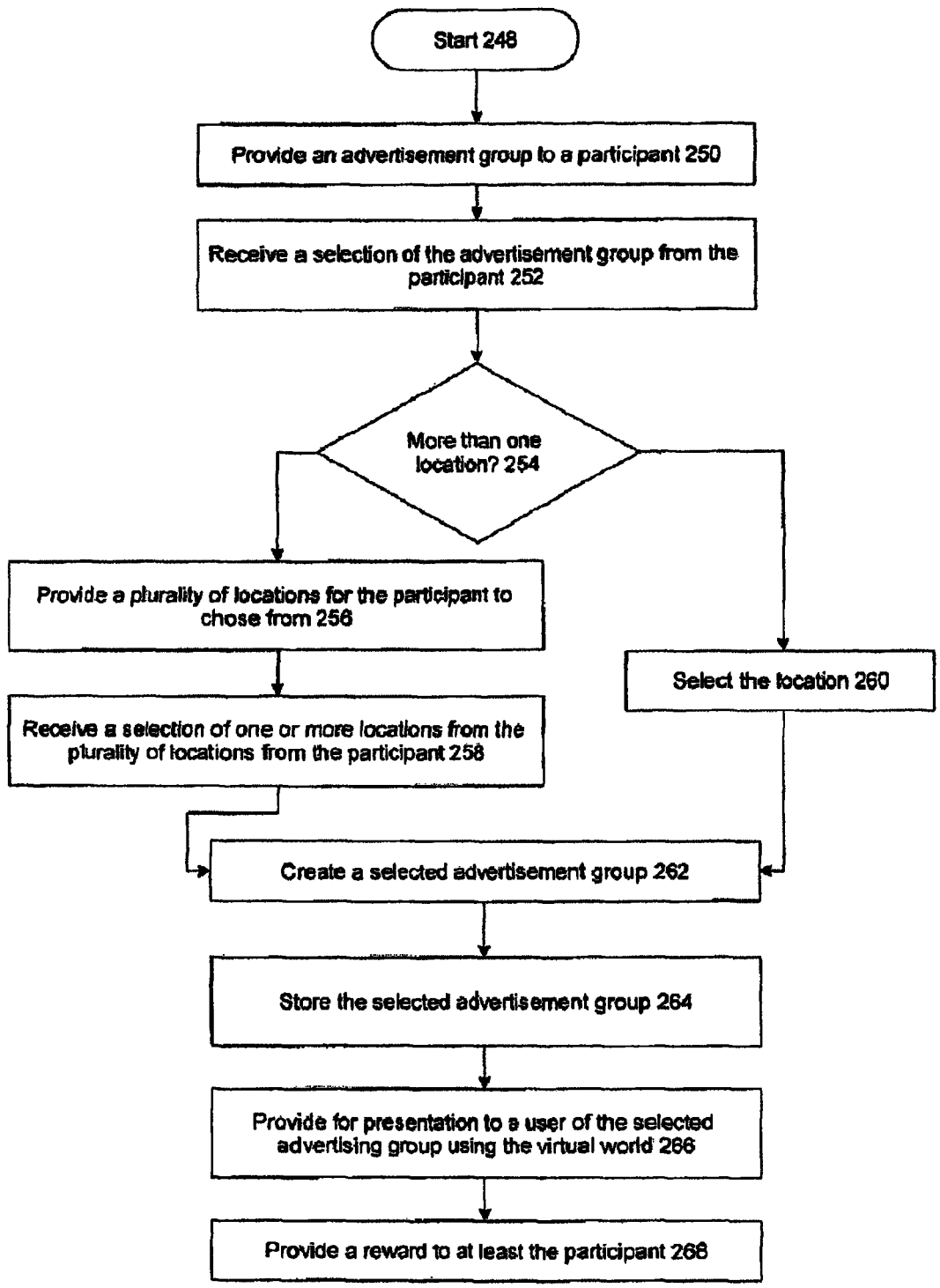

In FIG. 2C, a flowchart illustrating an exemplary method of the invention, according to various aspects of the invention. The method may be performed, as is described herein, by computers or other machines with access to machine readable storage medium. The method begins operation at 248 and may proceed to operation 250, where an advertisement group may be provided to a participant. According to aspects of the invention, the advertisement group itself may include at least one of an advertisement, one or more advertisements of one or more categories, or one or more advertisements of one or more advertisement profiles. The method may proceed to operation 252.

At operation 252, the method may receive a selection of the advertisement group from the participant, and may proceed to operation 254. At operation 254, the method determines whether there is more than one location upon which the advertisement group may be placed. When a plurality of locations exists, the method may proceed to operation 256 and may provide the plurality of locations for the participant to choose from, in order to present the advertisement group using the virtual world. The method, at operation 258, may receive a selection of one or more locations from the plurality of locations from the participant. When only one location exists, the method, at operation 260, may select the location.

At this point, from either of operations 258 or 260, the method may proceed to operation 262, and may create a selected advertisement group from the selection of the advertisement group and, when there is more than one location, the selection of the one or more locations.

The method of the invention, according to various aspects of the invention, may proceed at operation 264 to store the selected advertisement group. In aspects of the invention, the method may store one or more of these items in one or more of the various databases described above with respect to FIG. 1, 2A or 2B. The method then may proceed to operation 266.

At operation 266, the method may provide for presentation to a user of the selected advertisement group using the virtual world, wherein the users have access to the virtual world; and, then, at operation 268, the method then may provide a reward to at least the participant. According to aspects of the invention, the reward may be based on at least the creating of the selected advertisement group. In an alternative aspect, the reward may be based on other criteria, as described elsewhere herein, and as one of ordinary skill in the art would appreciate based at least on the teachings provided herein.

In aspects of the invention, the advertisement group and the plurality of locations may be provided using at least one of i) the virtual world or ii) an ancillary support environment. In additional aspects of the invention, the ancillary support environment may include one or more interfaces for exchanging information and choices.

Figure 2D:
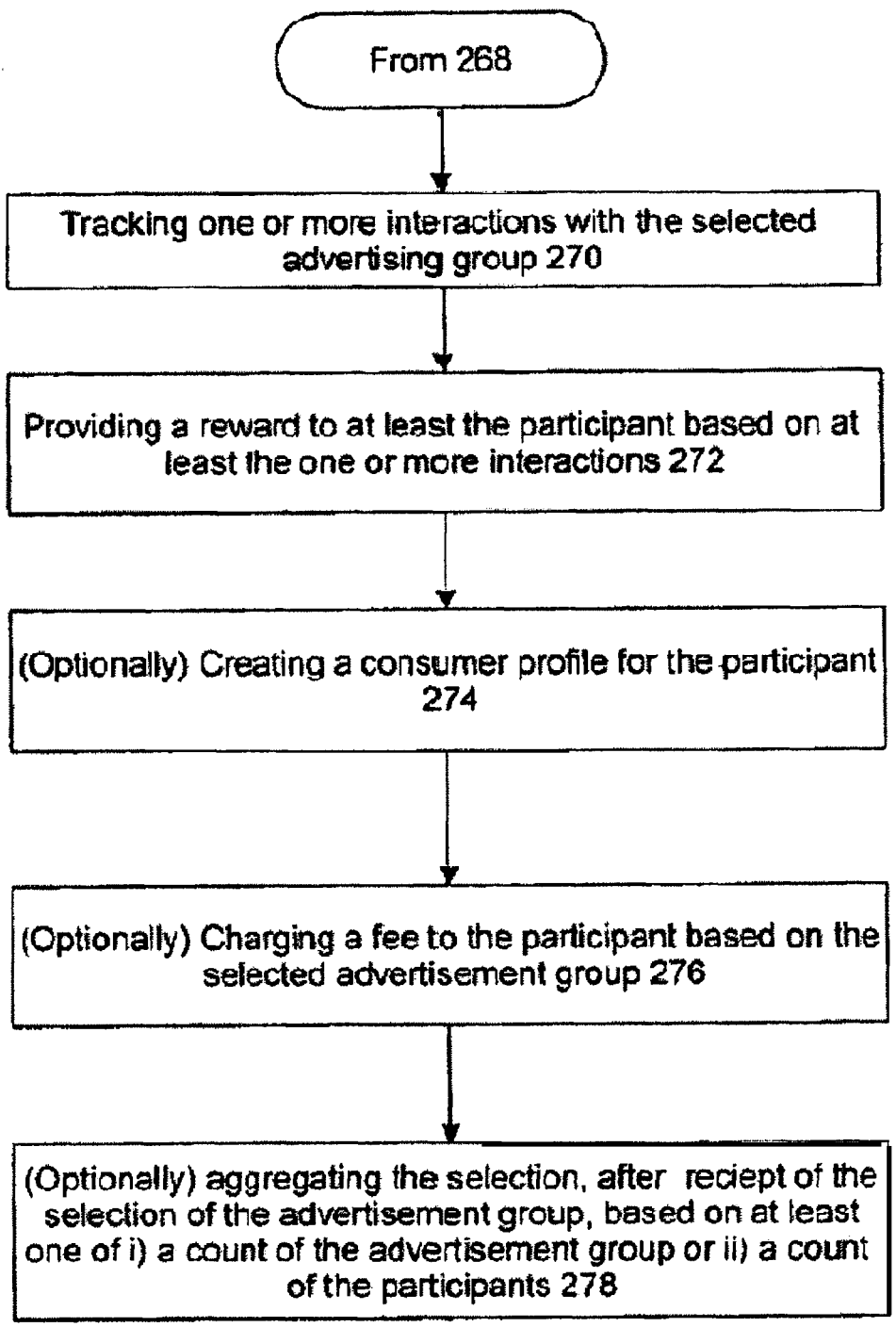

In FIG. 2D, the method of the invention may, according to aspects, perform the additional operations of: (operation 270) tracking one or more interactions with the selected advertisement group by the user; and (operation 272) providing a reward to at least the participant, wherein the reward may be based on at least the one or more interactions or the like.

According to aspects of the invention, the reward may be tangible or intangible and may include at least one of coupons, merchandise, credits, goods, services, information about the virtual world, information about real world events, opportunities in the virtual world, real money, virtual money, codes to unlock levels in a game, information to access restricted areas of a virtual world, digital music downloads or the like.

In an optional aspect of the invention, the method may perform the operation of creating a consumer profile for the participant, wherein the consumer profile includes at least one of (a) registration information, (b) environment continuation information to allow the participant to continue where the participant previously left in the virtual world, (c) information on one or more the selected advertisement groups of the participant, (d) information on the selection of the advertisement group, or (e) information on the at least one selection of the one or more locations, or (e reward information. This operation is illustrated in FIG. 2D, as operation 274. In further aspects of the invention, the category may include type of product, brand, vendor, company, a specific product, products relevant to a specific activity or interest, or advertisements of a specific advertiser or the like.

In another aspect of the invention, the advertisement profile may include a plurality of the advertisements selected from one or more categories. In yet another aspect of the invention, the advertisement profile may be provided by the participant.

As one of ordinary skill in the relevant art would recognize, the interactive medium, which includes a virtual world or a virtual environment, may include, based on the expanded teachings of interactivity provided herein, media displayed on mobile devices, streaming video, streaming audio, radio, television, voice portal, web site, web meeting, an information presentation environment and the like. According to other aspects of the invention, the storing operation of the method may use a computer, an off-line storage medium, a portable device, and so on as is described elsewhere herein with respect to at least FIG. 1.

According to alternative aspects of the invention, the ancillary support environment 111 may include electronic mail, web browser, online agent, instant messaging, paging, text messaging, short message service, mobile station, internet-enabled device, user equipment (UE), any future advancement thereof, or the like.

As described elsewhere herein, according to aspects of the invention, the advertisement may include a logo, name, commercial symbol, virtual object associated with an advertiser, audio, video, banner, spokesperson, mascot, character or so on.

As one of ordinary skill in the art would appreciate based at least on the teachings provided herein, the location may include, but is not limited to, a wearable display, a game piece, a game card, a game element, a display controlled or influenced by the participant, a web page, an internet resource, a time slot in an audio or video stream, radio or television broadcast, on-hold audio message, real world clothing, dress, sticker, billboard, poster, vending machine, programmable paper, media projected onto a real-world space or the like.

As one of ordinary skill in the art would appreciate based at least on the teachings provided herein, the reward may be tangible or intangible such as contest clues, licensing fees royalty fees or so on.

In one aspect of the invention, the one or more interactions may include increasing the reward when aspects of the virtual world are shared using the advertisement group, tracking click events and click-through events, or transferring aspects of the virtual world to another medium. For example, rewards to a participant may be increased if his or her advertisements are clicked on by a user, resulting in bringing up a web page from which a purchase may be effected.

In many of the aspects described herein the method may operate to pay the reward(s) to an advertiser. In alternative aspects of the invention, the reward to the advertiser may be different from the award to the consumer. In further aspects, there may not be an immediate reward to anyone.

In an alternative aspect of the invention, the method may include the operation of charging a fee to the participant based on the selected advertisement group. This operation is illustrated in FIG. 2D as operation 276. In aspects of the invention, the method may charge a fee to a participant for access to particular advertising materials, such as those including various celebrities, new products, various musical soundtracks, scores, etc.

In an alternative aspect of the invention, the method may optionally aggregate the selection, after the receiving the selection of the advertisement group, based on at least one of i) a count of the advertisement group or ii) a count of the participants, as is illustrated in FIG. 2D as operation 278. In further aspects of the invention, the method may aggregate other elements generated or tracked before, during or after each or any of the operations described herein. In one aspect of the invention, the aggregation operation may be performed at a public event, such as, but not limited to, a theatre, where participants in the audience make individual selections of one or more advertisement groups that are aggregated to determine a selection of the overall audience.

In another aspect of the invention, the method may provide for the presentation of the selected advertisement group, which may occur at user-selected places and times or at places and times determined by at least sensors that provide information indicating the users actions or the user's location. For example, a cellular telephone equipped with short-range wireless technology may provide persistent information about the selected advertisement group, and places and times for its presentation on a publicly-viewable display when the user carries the phone within the wireless communication range of the display.

Figure 5:
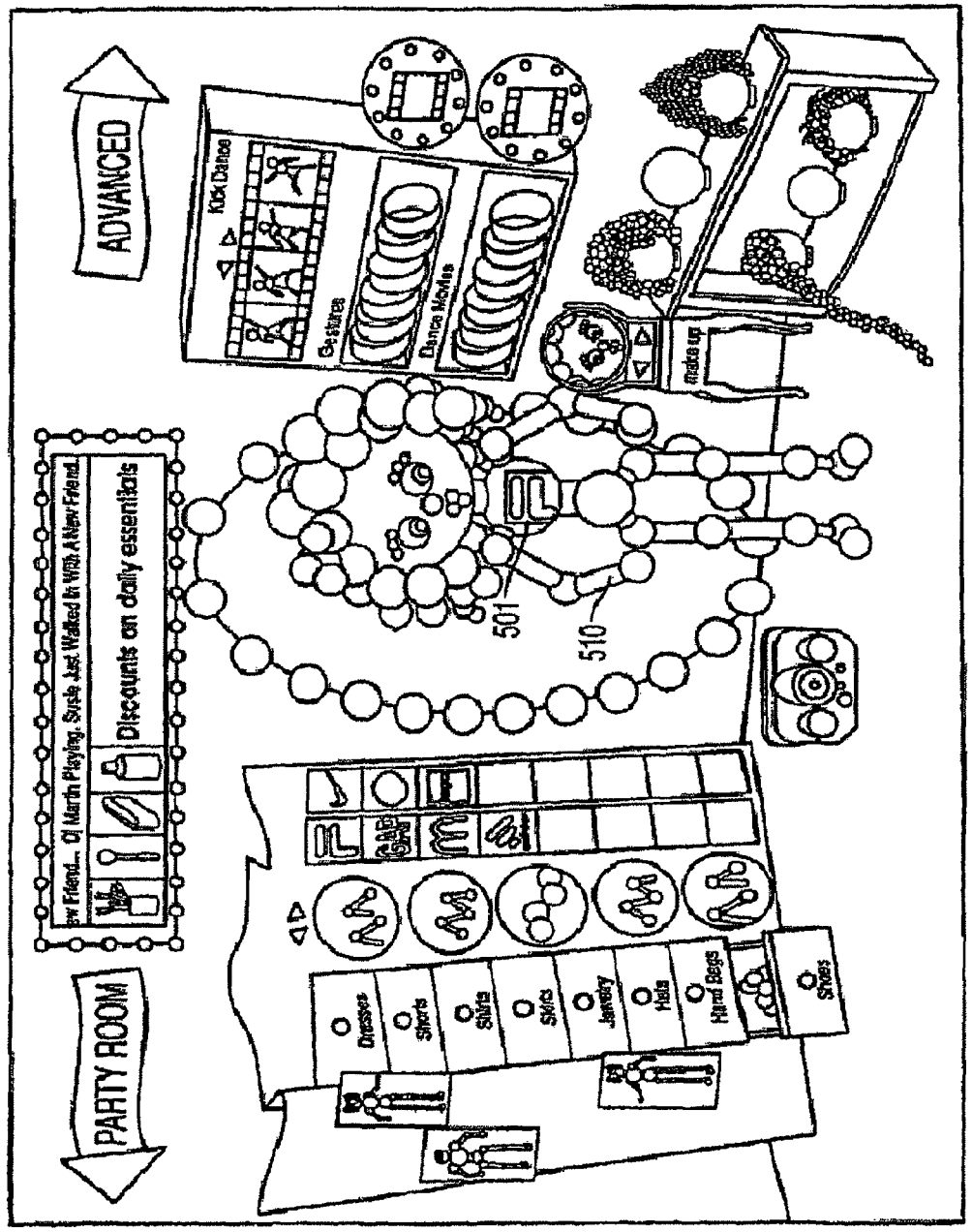
FIG. 5 shows a scene from a virtual world in accordance with one aspect of the invention, in which a participant's avatar is wearing an item of clothing with a participant-selected designer logo.

If the advertisement(s) are purely graphical in nature, they may be presented on the 2D avatar image or 3D avatar form using any means known to those of ordinary skill in the art. If they contain audio or animation or other multimedia elements, these elements may be played as part of the avatars' behavior at times designated by the user or determined by the system. FIG. 5 shows a screen from an aspect of the invention in which branding 501 is displayed on avatar 510, which is engaged in animated activity within the virtual world (hosting a party). Other presentation forms are contemplated.

The time and manner of the presentation of the selected advertisement may be determined entirely by the consumer, or may be at least partially controlled by server(s) 102, 104. For example, a corporate logo may be available for presentation on a cap worn by an avatar, an audio sequence may be available to play each time an avatar performs a specified action, such as waving, and a musical routine may be available for an avatar to perform whenever the consumer controlling the avatar chooses. The advertisement may be created by any party commissioned to do so by the advertiser, including the consumers themselves. Consumers might be encouraged to submit ideas to the host or the advertiser regarding advertisements that may be made available for presentation in the virtual world. Consumers might also themselves be advertisers, and submit and place their own advertising. Alternatively, consumers may be empowered to combine, or "mash up," elements to create new ads. Such mash-ups may be available to only the consumer who creates the mash-up, or they may be available to all consumers. In addition, there may be prizes or other rewards offered to the consumer(s) who creates the most popular and/or effective mash-ups.

Figure 6:
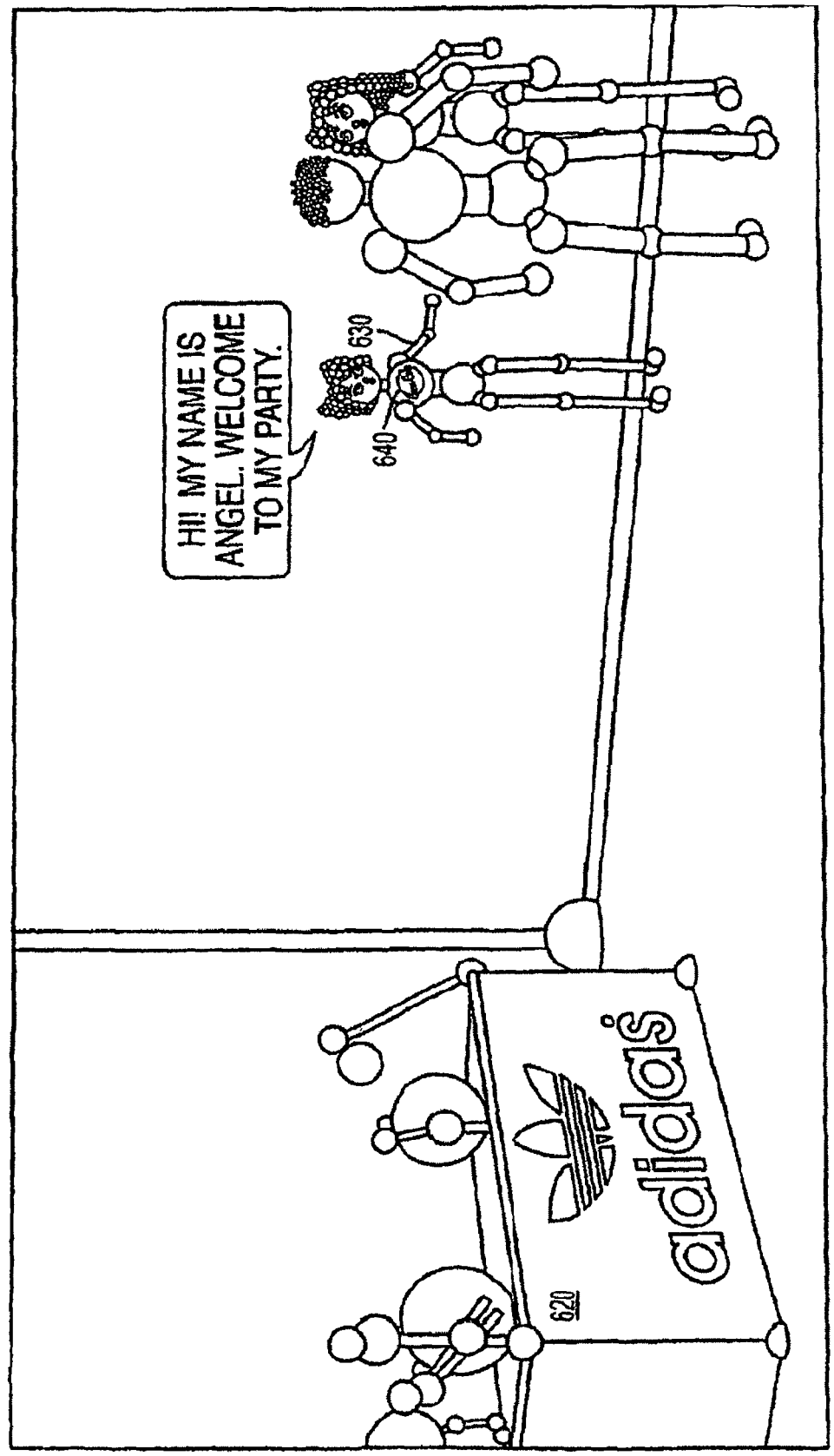
FIG. 6 shows a scene from a virtual activity in accordance with one aspect of the invention, in which a participant has selected to put a Coca-Cola® logo on the participant's avatar and an Adidas® poster on the participant's furniture in a virtual space.

In addition, as described herein, the placement of an advertisement is not limited to the virtual person of a human-like avatar. For example, a poster may advertise a product in a virtual space that may be controlled or shared by an avatar, such as the avatars virtual room, studio, or virtual wall space. In alternative aspects, a user may operate a virtual store with multiple advertisements being presented within a space that is controlled by him/her. For example, in one or more aspects of the invention, space and room are examples of locations in the virtual world, however, the locations are not limited to just these examples, as one of ordinary skill would appreciate based at least on the teachings provided herein, other locations may be constructed, selected, and/or provided. For example, FIG. 6 shows a screen from an aspect of the invention in which an avatar 630 is engaged in animated activity within the virtual world. The consumer has named the avatar 630 as Cindy, and s/he has selected to place the name "CINDY" on her body 640. The consumer has also selected to place a Nike logo on her body 610, and a Coca-Cola poster on the wall 620. If the advertisement(s) are purely graphical in nature, they are texture-mapped onto the 2D image or 3D form in virtual spaces. If they contain audio or animation or other multimedia elements, these elements may be played at times designated by the user or determined by the system.

Alternatively, the advertisement may be presented on a display controlled or shared by a user and viewable by the user or by others in the real world. The presentation may occur at user-selected places and times, or the determination of place and time for presentation could be performed by the server(s) 102, 104 based in part on sensors known in the art that provide information indicating the user's actions or location (for example, sensing real-world location from Global Positioning signals).

Another aspect of the invention is that users may be given incentives for choosing to include advertisements on their avatars. In exchange for choosing a particular advertisement, the consumer may be awarded units of money, credits or coupons that can be applied towards buying whole or fractional goods and services (in the real or virtual world), clues for winning games and contests, other information or opportunities with perceived value, or any other scarce or present resource. In one aspect, the invention provides a mechanism for money or credits to be deducted directly from the sponsor's account, though this is optional.

Rewards may accrue to a user simply for the act of choosing an advertisement. At a minimum, the user him/herself is exposed to the ad as a result, and the potential created for later exposure to other users. The size of the reward may depend on criteria such as exposure (measured or anticipated) of the advertisement to the audience, as measured in number of users in the environment, the number of users viewing the environment, the number of minutes the advertisement is presented in the environment, or some combination of these. According to additional aspects of the invention, rewards may be based on attributes of the presented ad such as its size, orientation, or the presence of animation or sound.

Rewards might also take into account the user's status in the virtual world, such as the amount of land or other relevant resources accumulated in a multi-player game of conquest, or elements in the consumer's profile in the consumer database 150. An advertiser may also reward consumers for submitting for the advertiser's consideration designs for inclusion in the list of advertisements available for selection and presentation by other consumers in the virtual world. Further, user rewards may be based in whole or in part on a proportion of the compensation paid to the host by the advertiser whose advertisement has been selected, or on any other criterion deemed suitable by the advertiser or the host proprietor.

Moreover, host and advertiser could structure the rewards with a view toward increasing traffic to and average time spent in the particular virtual world. For example, the size of the reward could increase with the amount of time spent presenting the advertisement, and thus with the amount of time spent in the virtual world. In another aspect of the invention, the size of the reward could increase when the consumer shares aspects of the visual world (such as scenes or links) with others, when a viewer of the advertisement connects with other networked information related to the advertisement (such as "clicking through" from the advertisement in a virtual world to an informational web page elsewhere in the networked environment), or when the user transfers a scene containing the advertisement to another medium (such as an email or a printed image). The consumer presumably will take into account the reward structure in making decisions regarding his/her participation in the virtual world. The decisions of interest to the host may be recorded in the presentation tracking database 154.

Depending on the nature of the reward, distribution of the rewards to users may be handled in the virtual or in the real world. Increasing the credit an avatar may draw on in a virtual casino, for example, may likely be done entirely in the virtual world, while awarding product samples may require mailing those samples in the real world, just as rewarding frequent flier miles would require updating the consumer's account stored in a computer that is not necessarily part of the virtual world. The host may establish appropriate ancillary systems of well-known types to handle such tasks.

Server(s) 102, 104 may maintain several databases, including customer database 150 and presentation tracking database 154 mentioned above, as well as advertising database 152. FIGS. 4A, 4B and 4C show the database fields for users, advertisers and transactions, respectively, as used in aspects of the invention. As one of ordinary skill in the relevant arts would appreciate based at least on the teachings provided herein, the database fields may be constructed to facilitate the exchange and tracking of information in accordance with the aspects of the invention. Other database arrangements are contemplated.

The server(s) 102, 104 may track and record in the appropriate database, 152, information relevant to billing an advertiser, such as the total time 433 that advertisement 431 is presented in the environment 432, the number of other users that are visually exposed to the advertisement 434, the number of non-participant viewers who are visually exposed to the advertisement 436, or the total times of these exposures 438. This information may be stored in presentation tracking database 154 by the server. Off line programs (shown in FIG. 1 as billing system 170) may use this information to generate information for billing the advertisers. Alternatively, the client software may track this information, and transmit it periodically to the server. In another alternative aspect, some or all of the information may be stored in a smart card or other off-line storage medium, as described elsewhere herein. In addition, such off-line storage devices may be updated periodically and may not require a persistent connection.

Consumer database 150 may include profiles of consumers (401) who have participated or have expressed an intention to participate in the particular virtual world. It may include user registration information (402-405). The consumer database may include information (406) necessary to allow a consumer to pick up where s/he previously left the virtual world by storing information about her/his avatar and its recent activities. The database may also be used to assemble information about the consumer from any kind of virtual or real world source to allow the advertisers to better target their advertisements and reward offers 407. Consistent with privacy obligations and commitments, the host may keep track of various data relating to a consumer's participation in the virtual world, such as the actions of the user's avatar, the user's purchases, the amount of time the consumer spends in the virtual world, the scores or other quantifications of accomplishment achieved by the avatar in a game, as well as the consumer's choices with respect to the advertisements offered to him/her for present in the virtual world 408. The host may also use these data to update the consumer's profile in the consumer database 150.

The advertisement database 152 may include an ID (421) for each advertisement available for selection by the consumer. The advertisement may include text, symbols such as corporate logos, graphic elements such as pictures of a product, video or animation sequences, audio elements, or any other multimedia elements designed or the like to enhance a particular brand, to create consumer awareness of a particular product or the consumer's need for it, to promote sales of a particular product, or to promote awareness of a particular source of consumer goods. If the advertisement is being served externally, an appropriate address or pointer may be placed in the database. The advertisement may be as simple as branding or as complex as a video/audio sequence in the style of a television commercial. The advertisement database may also may include information on how the advertisement will be presented once a consumer selects it.

To derive revenue from the advertisements, the host of the networked virtual environment may do one or more of the following:

Charge the advertiser based upon exposure (measured or anticipated) of the advertisement to the audience, as measured in number of consumers in the environment, the number of non-participants viewing the environment, the number of minutes the avatar presents the advertisement in the environment, or some combination of these.

Charge the advertiser a fixed or time-variable fee for its advertisements to be included in the set of advertisements that the consumer can choose from.

Charge the consumer a fee which is passed in part to the sponsor as a licensing fee or royalty. Factors determining the fee to the advertiser may also include the make-up of the pool of participants in the virtual world, the hours of the day during which the advertisement is displayed, the complexity of the advertisement, the number of times a particular advertisement was selected in a given period of time, the total time that the advertisement is displayed, and the actual or anticipated number of participant and/or users exposed to the advertisement.

The actual billing of the advertiser may be handled using a billing support system 170 that uses information obtained from databases 150, 152 and 154 to calculate the fee owed by the various advertisers in accordance with the applicable factors as discussed above.

There are a number of other benefits that may result from consumer-chosen advertising in accordance with the present invention. When selecting a particular advertisement, the consumer not only confirms his/her own interest in a particular product or his/her allegiance to a particular brand, but also may (i) become an advertising subject, and (ii) become a vehicle for delivering advertising to the other consumers participating in or viewing the world. In an aspect of the invention, for these other consumers, the advertisement presented by this avatar contains information about the interests and beliefs of the consumer who is represented by this avatar, or the role this consumer wants his/her avatar to play. Thus, noticing the advertisements presented by the various participants may further the consumers' intentions in participating in the virtual world in the first place. For example, the particular advertisement presented by a participant may become a conversation opener in a chat-room, or a basis for choosing allies in a multi-player game just to name a few.

In an alternative aspect of the invention, one of ordinary skill in the art will be able to use the advertising method depicted in FIG. 1 and described herein for presenting virtual advertisements in the 'real world.' The user may perform the selection and placement process by using the client computer programs (122, etc. in FIG. 1), which need not have continuous connectivity to the computer network (110). When the user indicates s/he is satisfied with the selection, the relevant information may be transmitted to the server(s) 102, 104 and may be optionally stored in consumer database 150 or presentation tracking database 154, or other devices as described elsewhere herein. At selected times or places, the relevant advertisements may be dynamically included in the presentation on the display(s) 132, 134, 136. Other users who are nearby in the real world may thus exposed to this advertisement. The user also may view ads placed by other users on or in connection with their displays. Server(s) 102, 104 cause the exposure of advertisements in this manner to be logged in databases 150, 154.

In another alternative aspect of the invention, one of ordinary skill in the art may be able to use the advertising method depicted in FIG. 1 and described herein to store the consumer database 150 and/or presentation tracking database 154 on an off-line storage medium such as a "smart card," or on storage media not directly connected to server(s) 102, 104.

Other applications of the present invention may include the following:

"Advertisements" promoting anything at all can be constructed by user-participants for other user-participants to use. All the compensation schemes discussed above may be applied, with virtual-world money or possibly real-world money.

User-participants may organize sponsored events (perhaps only open to avatars sporting the appropriate advertisement) in the virtual world and receive compensation for this.

User-participants may construct novel advertisements (on behalf of real-world advertisers) that are appropriate to the networked virtual world. These may be submitted electronically to the advertiser for approval. If approved, they would become available for consumers to place on their avatars. Optionally, the constructor of the approved advertisement may receive compensation from the advertiser based on any of the above compensation schemes.

User-participants can select advertisement(s) to be presented on a web page (for example, a "banner ad") served by a server for him/herself or other real-world people to see, with compensation determined as above.

Users may select advertisement(s) to be placed on a real-world object that is custom-built using techniques known in the art for custom manufacturing, for example, an article of clothing, a towel, a vehicle license plate, or a vehicle license plate holder.

The avatar may operate in the real world rather than a virtual world, for example as a robot or other means of 'telepresence.'

The display may be wearable and connected via wireless connection to the client computer, and the wearer of the display may select advertisement(s) to be presented for other real-world people to see, with compensation determined as above.

The display may be transported by the consumer (for example, on an automobile or shopping cart) and connected via wireless connection to the client computer, and the transporter of the display may select advertisement(s) to be displayed for him/herself other real-world people to see, with compensation determined as above.

The advertisements may be audio or video, and inserted into streaming media (such as a telephone conversation, an audio stream from a radio broadcaster or voice portal, an on-hold message, or a video stream transmitted to or recorded by the user or the like) at points in time or upon events selected by the user, for presentation to him/herself or other real-world people.

Avatars may be configured, and advertisements may be selected and/or constructed not by the users themselves but by software agents or "bots" that are instructed or programmed by the users.

The display and computer may both be wearable, with the computer connected via wireless connection to the network, and the wearer of the display may select an advertisement to be displayed for other real-world people to see, with compensation determined as above.

User-participants may select a group or category of advertisement (such as ads about a specific product type, a specific product, products relevant to a specific activity or interest, or advertisements of a specific advertiser), after which the system or host may select the specific ad from the selected group or category.

User-participants may participate in a group selection process to determine the advertisement(s) to be presented, e.g., in a voting process.

User-participants may create a user profile indicating the groups or categories of advertisements they wish to present. Then the system or host may select the specific ad from the selected group or category based on information stored in the user-created profile.

User-participants can select modified or enhanced behaviors to be presented in conjunction with the selected advertisement.

Figure 7:
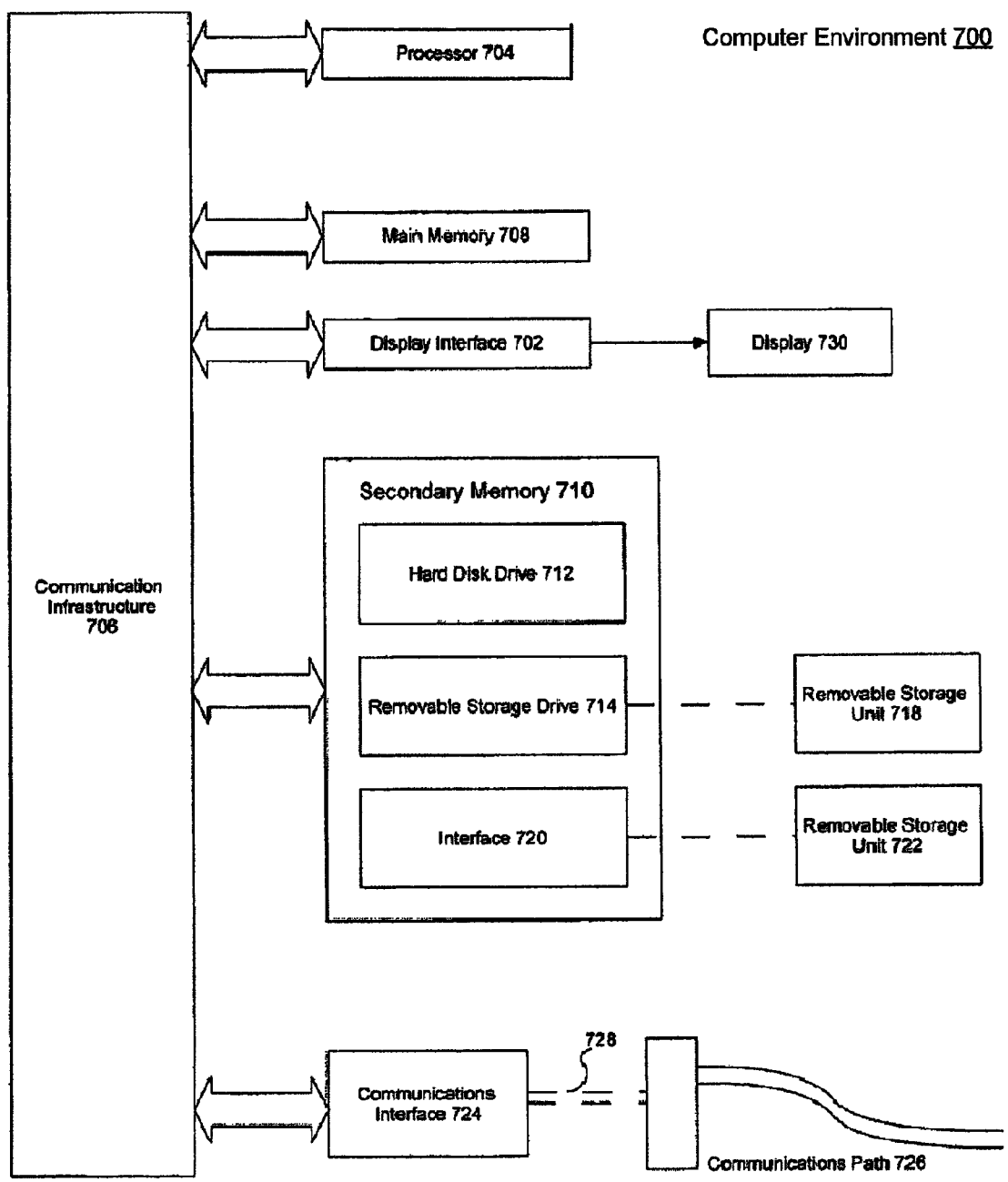
FIG. 7 illustrates a diagram of a computing environment capable of being adapted to perform the operations of the advertising system, according to an aspect of the invention.

The present invention (i.e., the operations or components of the invention, including those illustrated in the figures or any part thereof may be implemented using hardware, software or a combination thereof and may be implemented in one or more computer systems or other processing systems. In one aspect, the invention may comprise one or more computer systems capable of carrying out the functionality described herein. An example of a computer system 700 is shown in FIG. 7. The computer system 700 may include one or more processors, such as processor 704. The processor 704 may be connected to a communication infrastructure 706 (e.g., a communications bus, cross over bar, or network). Various software aspects are described in terms of this exemplary computer system. After reading this description, it will become apparent to a person skilled in the relevant art(s) how to implement the invention using other computer systems and/or computer architectures.

Computer system 700 may include a display interface 702 that may forward graphics, text, and other data from the communication infrastructure 706 (or from a frame buffer not shown) for display on the display unit 730.

Computer system 700 may also include a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc., but which is not limited thereto. The removable storage drive 714 may read from and/or write to a removable storage unit 718 in a well-known manner. Removable storage unit 718, may represent a floppy disk, magnetic tape, optical disk, etc. which may be read by and written to by removable storage drive 714. As will be appreciated, the removable storage unit 718 may include a computer usable storage medium having stored therein computer software and/or data.

In alternative aspects, secondary memory 710 may include other similar means for allowing computer programs or other instructions to be loaded into computer system 700. Such means may include, for example, a removable storage unit 722 and an interface 720. Examples of such may include, but are not limited to, a program cartridge and cartridge interface (such as that found in video game devices), a removable memory chip (such as an EPROM, or PROM) and associated socket, USB based "thumb" drives, and/or other removable storage units 722 and interfaces 720 that may allow software and data to be transferred from the removable storage unit 722 to computer system 700.

Computer system 700 may also include a communications interface 724. Communications interface 724 may allow software and data to be transferred between computer system 700 and external devices. Examples of communications interface 724 may include, but are not limited to, a modem, a network interface (such as an Ethernet card), a communications port, a PCMCIA slot and card, etc. Software and data transferred via communications interface 724 may be in the form of signals 728, which may be, for example, electronic, electromagnetic, optical or other signals capable of being received by communications interface 724. These signals 728 may be provided to communications interface 724 via a communications path (i.e., channel) 726. This channel 726 may carry signals 728 and may be implemented using wire or cable, fiber optics, a phone line, a cellular phone link, an RF link and/or other communications channels.

According to an exemplary aspect of the invention, the participants may include a company with a product to promote ("the company"), an advertising agency working on behalf of the company ("the agency"), at least one provider of an interactive medium ("the host"), and at least one user of an interactive medium ("the user" or "users"). The agency may develop an advertising campaign for the launch of a new product from the company. The campaign may include a range of ads that may be used to decorate objects. At least some of the ads in the campaign may include an interactive corporate logo. The ads, including the company logo, may be animated and/or may contain an audio component. As an alternate aspect, the user may be able to create customized advertisements by combining (or "mashing up") individual advertisement components and/or elements. Examples of elements include a company logo, a representation of the product, a representation of a company spokesperson, and company trademarks.

A user may be asked to register with the advertising campaign and to use at least one ad, either provided by the agency and/or company or created by the user, in some version on the user's avatar, space, property, user-controlled space, or similar user-affiliated environment in the interactive medium, a portion of the user's web page or blog, the user's instant messaging application, or the like. Alternatively, the user may transmit the animated and/or audible advertisement, including the company's logo, in the user's email, video or audio blog (also known as a "podcast"), or website. The company, agency, and/or host may find it desirable to limit the size, type, and/or number of advertisements a user displays (e.g. on the user's avatar) to avoid over exposure that may generate negative sentiments among the viewers of the advertisements. As a reward for registering with the advertising campaign and downloading the advertisement, the user may receive, for example, a free download of a digital music file of the user's choosing. Other rewards, including those discussed elsewhere in this application, are contemplated and are within the scope of the invention.

The advertisement itself may be linked to a tracking system that accumulates statistics on the registered user and records each time, for example, the user places the advertisement in an email message, the user displays the advertisement on a web page, or the advertisement is clicked on, viewed, or otherwise interacted with by another user (not the registered user) in the interactive medium. Clicking on an ad, as an example of an interaction, may, e.g., send a viewer to a web page about the company or to an area of a virtual world dedicated to the company and the advertising campaign. Tracking data may be made available to the agency, the company, the host, and/or the registered user.

The user may receive additional rewards, as outlined above, for reaching certain thresholds or quotas of interaction. Continuing the above example, the user may receive an additional free digital music download or similar reward at 20 interactions, 50 interactions, and every 100 interactions thereafter. Alternatively, different types of interactions may be weighted differently, as evidenced by a "point value" or other scheme, based on the relative value placed on each type of interaction by the company, agency, and/or host. For example, simply viewing an advertisement on a web page may only be worth 1 point per view. Each time a visitor to the web page clicks on the advertisement, the registered user may be awarded 5 points. Each time the advertisement is interacted with on the user's avatar in, for example, a virtual world, the user may receive 30 points. Under this aspect, the points may be redeemed for rewards based on a rate determined by the agency, the company, and/or the host. For example purposes only, each digital music download may "cost" 25 points. Regardless of the reward scheme used, it may also be desirable to provide an extra incentive and provide a substantial reward to the top registered users at the end of the campaign. Under such an aspect, a number, e.g. one thousand, of the registered users with the most, e.g., interactions or overall points may receive a prize of substantial value. This prize may be, by way of example only, a top-of-the-line digital music player, a high-end mobile phone with a year of free service or the like.

Additional examples of prizes include coupons, gift cards, codes to gain access to restricted areas in a virtual world, and information to unlock levels in a game. The "grand prize" awarded to top performer(s) may, for example purposes only, be the opportunity to appear in the company's commercials. Such commercials may appear on traditional media, such as television and print ads, or on interactive media, such as a virtual world, or both.

By making tracking data available to the registered users, the agency, company, and/or host may empower the users to create and deploy more effective advertisements. In other words, the registered users may be incentivized to display ads through the reward system. By reviewing a user's tracking data, the user may be able to determine which ads are more effective at generating rewards for the user. The user may then create more ads, or adjust the manner in which the ads are displayed, to maximize the user's reward. These ads, presumably, are also more effective at conveying the company's message and achieving the goals of the advertising campaign.

Moreover, by adjusting the rewards assigned to certain categories of advertisements, the agency and/or company may, for example, encourage users to create ads in those categories. The agency and/or company may adjust point value, or other rewards, based on, for example, tracking data about which types of advertisements or which advertising channels are the most effective. For example, virtual reality may be more effective than web pages. Alternatively, the company and/or agency could weight ads to emphasize more interactive ads, such as, for example, those implemented in a virtual world, over more traditional "push" or display ads.

If the rewards offered to registered users are complementary goods to the product being advertised, then the company and/or agency may also track to see which of the users purchase the product. For example, a campaign for a new digital music player may offer free digital music downloads, carrying cases, headphones, and other related goods as rewards. The company and/or agency may wish to collect information related to which of the registered users bought the advertised digital music player. The company and/or agency may also wish to collect related information, such as, e.g., whether the user already owned a digital music player, and whether that player was made by the company or one of its competitors, in an effort to determine how many registered users were induced by the rewards to purchase the product and how many users registered with the advertising campaign because they already owned a related device.

Additionally, the invention contemplated herein may also include optimizing any one or more of the above-described processes including optimizing the selecting of an advertisement, optimizing the selecting of a location, optimizing the creating of a selected advertisement, optimizing the providing of a reward and so on. This optimization may be executed in an automated manner. Moreover, the automated manner may be a process performed by one of statistical processing, artificial intelligence, predictive analytical techniques or the like.

In this document, the terms machine or computer readable storage medium and machine or computer usable medium are used to generally refer to media such as, but not limited to, removable storage drive 714, a hard disk installed in hard disk drive 712, and signals 728. These computer program media are means for providing software to computer system 700.

Computer programs (also called, among other things, computer control logic) may be stored in main memory 708 and/or secondary memory 710. Computer programs may also be received via communications interface 724. Such computer programs, when executed, enable the computer system 700 to perform the features of the invention as discussed herein. In particular, the computer programs, when executed, may enable the processor 704 to perform the invention in accordance with the above-described aspects. Accordingly, such computer programs represent controllers of the computer system 700.

In an aspect where the invention is implemented using software, the software may be stored in a computer program product and loaded into computer system 700 using, for example, removable storage drive 714, hard drive 712 or communications interface 724. The control logic (software), when executed by the processor 704, causes the processor 704 to perform the functions of the invention as described herein.

In another aspect, the invention may be implemented primarily in hardware using, for example, hardware components such as application specific integrated circuits (ASICs). Implementation of the hardware state machine so as to perform the functions described herein will be apparent to persons skilled in the relevant art(s). As discussed above, the invention is implemented using any combination of hardware, firmware and software.

While various aspects of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary aspects, but should be defined only in accordance with the following claims and their equivalents.

What is claimed is:

1. A machine readable storage medium storing instructions that, when executed by a machine, cause the machine to perform selected advertising within an interactive medium, the instructions comprising:
   providing an advertisement group to a first user, wherein the advertisement group comprises at least one advertisement;
   receiving a selection of at least one advertisement from the advertisement group from the first user to generate a selected advertisement;
   when a plurality of locations exists, providing the plurality of locations to the first user to choose to present the selected advertisement within the interactive medium and receiving a selection of at least one location from the plurality of locations from the first user;
   presenting the selected advertisement to at least one user within the interactive medium, wherein the at least one user has access to the interactive medium;
   providing a reward to at least the first user, wherein the reward is based on at least the presenting of the selected advertisement; and
   tracking at least one of the selected advertisement, the presenting of the selected advertisement, and the providing of the reward to generate tracking data for at least one of billing purposes, optimizing the selecting an advertisement, optimizing the selecting a location, optimizing the creating a selected advertisement, and optimizing the providing a reward.

2. The instructions of claim 1, wherein the advertisement and the at least one location are selected using at least one of the interactive medium and an ancillary support environment, wherein the ancillary support environment includes at least one interface for exchanging information and choices.

3. The instructions of claim 2, wherein the ancillary support environment comprises at least one of electronic mail, web browser, online agent, instant messaging, paging, text messaging, internet resources, video messaging, and short message service.

4. The instructions of claim 2, wherein the interface comprises at least one of a mobile station, a wireless device, user equipment, an internet enabled device, a media player, and a gaming system, and wherein the machine comprises at least one of a processor executing the instructions and a plurality of processors executing the instructions in a distributed manner.

5. The instructions of claim 1, wherein providing a reward comprises:
   tracking at least one interaction with the selected advertisement by the at least one user; and
   providing a reward to at least the first user, wherein the reward is based on at least the at least one interaction.

6. The instructions of claim 5, wherein the at least one interaction comprises at least one of sharing at least one aspect of the interactive medium using the advertisement, tracking click events and click-through events, and transferring aspects of the interactive medium to another medium.

7. The instructions of claim 1, wherein the reward comprises at least one of coupons, merchandise, credits, goods, services, information about a virtual world, information about real world events, opportunities in a virtual world, virtual money, money, discounted products, discounted services, access to restricted content, contest clues, licensing fees, royalty fees, a benefit in a game, and increased social status.

8. The instructions of claim 1, further comprising:
creating a consumer profile for the first user, wherein the consumer profile comprises at least one of registration information, environment continuation information to allow the first user to continue where the first user previously stopped in the interactive medium, information on at least one selected advertisement of the first user, information on the selection of the advertisement, information on the selection of at least one location, and reward information.

9. The instructions of claim 1, wherein the interactive medium comprises media presented via at least one of mobile devices, streaming video, streaming audio, radio, television, voice portal, web site, web meeting, internet resources, internet enabled devices, gaming systems, and information presentation environment.

10. The instructions of claim 1, wherein the plurality of locations comprises at least one of a wearable display, a game piece, a game card, a game element, a display controlled or influenced by the first user, a portion of a web page, a portion of a web page for a period of time, a time slot in an audio or video stream, a portion of screen real estate in a video stream, a radio or television broadcast, an on-hold audio message, real world clothing, an electronic billboard, a billboard with a processor-controlled display, a vending machine, programmable paper, a virtual character, a virtual representation of a user, a virtual place, media present in a real-world space, and media projected onto a real-world space.

11. The instructions of claim 1, wherein the reward is also provided to at least one of an advertiser and a sponsor.

12. The instructions of claim 1, further comprising:
charging a fee to the first user based on the selected advertisement group.

13. The instructions of claim 1, wherein the presenting occurs at places and times selected by a user or determined by at least sensors that provide information indicating a users actions or a user's location.

14. The instructions of claim 1, wherein the interactive medium comprises media displayed on at least one of interactive television, an electronic bumper sticker, an article of clothing with a flexible screen, a billboard with a processor-controlled display, a mobile telephone, a personal digital assistant, a tablet computer, a mobile station, user equipment, a gaming system, an augmented reality display, a telepresence system, or a videoconference display.

15. The instructions of claim 1, wherein the interactive medium comprises at least one of a collaborative virtual environment, a multi-user virtual environment, a massively multiplayer online game, a virtual world, an interactive themed environment, or an augmented reality system.

16. The instructions of claim 1, wherein the advertisement group comprises at least one advertisement in at least one category.

17. The instructions of claim 16, wherein the at least one advertisement comprises at least one of an image, an audio clip, an animated image, a multimedia movie, a behavior for an object in the interactive medium, an object that confers a benefit in a game, or a multi-user event in the interactive medium.

18. The instructions of claim 16, wherein the at least one advertisement comprises at least one of a logo, a name, a commercial symbol, a virtual object associated with an advertiser, an audio clip, a video clip, or a banner.

19. The instructions of claim 16, wherein the at least one category comprises at least one of a type of product, a brand, a vendor, a company, a specific product, products relevant to a specific activity or interest, and advertisements of a specific advertiser.

20. The instructions of claim 1, wherein the advertisement group comprises an advertisement profile, the advertisement profile comprising a plurality of advertisements selected from at least one category.

21. The instructions of claim 20, wherein each of the plurality of advertisements comprises at least one of an image, an audio clip, an animated image, a multimedia movie, a behavior for an object in the interactive medium, an object that confers a benefit in a game, or a multi-user event in the interactive medium.

22. The instructions of claim 20, wherein the at least one category comprises at least one of a type of product, a brand, a vendor, a company, a specific product, products relevant to a specific activity or interest, and advertisements of a specific advertiser.

23. The instructions of claim 20, wherein each of the plurality of advertisements comprises at least one of a logo, a name, a commercial symbol, a virtual object associated with an advertiser, an audio clip, a video clip, or a banner.

24. The instructions of claim 20, wherein the advertisement profile is provided by the first user.

25. The instructions of claim 1, wherein the first user is a host of the interactive medium.

26. The instructions of claim 1, wherein the first user is a party commissioned to create the advertisement group.

27. The instructions of claim 1, wherein the at least one advertisement comprises at least one of an advertisement concept and an advertisement campaign within the interactive medium.

28. The instructions of claim 1, wherein the reward comprises intangible rewards.

29. The instructions of claim 1, wherein the first user creates at least one advertisement of the advertisement group.

30. The instructions of claim 1, wherein the reward is adjusted to incentivize the first user to choose certain options when at least one of selecting an advertisement, selecting a location, and creating a selected advertisement.

31. The instructions of claim 1, wherein billing purposes is at least one of billing a host of the interactive medium, billing an advertising agency, and billing a company that is advertising at least one of its products.

32. The instructions of claim 1, wherein at least one of optimizing the selecting an advertisement, optimizing the selecting a location, optimizing the creating a selected advertisement, and optimizing the providing a reward is an automated process.

33. The instructions of claim 32, wherein the automated process is performed by at least one of statistical processing, artificial intelligence, and predictive analytical techniques.

34. A method for selected advertising within an interactive medium, comprising:
providing an advertisement group to a first user, wherein the advertisement group comprises at least one advertisement;
receiving a selection of at least one advertisement from the advertisement group from the first user to generate a selected advertisement;

when a plurality of locations exists, providing the plurality of locations to the first user to choose to present the at least one advertisement within the interactive medium and receiving a selection of at least one location from the plurality of locations from the first user;

presenting the selected advertisement to at least one user within the interactive medium, wherein the at least one user has access to the interactive medium;

providing a reward to at least the first user, wherein the reward is based on at least the presenting of the selected advertisement; and tracking at least one of the selected advertisement, the presenting of the selected advertisement, and the providing of the reward to generate tracking data for at least one of billing purposes, optimizing the selecting an advertisement, optimizing the selecting a location, optimizing the creating a selected advertisement, and optimizing the providing a reward.

35. A system adapted to select advertising within an interactive medium, comprising:

a memory; and a processor coupled to said memory, said processor adapted to provide an advertisement group to a first user, wherein the advertisement group comprises at least one advertisement;

to receive a selection of at least one advertisement from the advertisement group from the first user, to generates a selected advertisement;

when a plurality of locations exists, to provide the plurality of locations to the first user to choose to present the at least one advertisement within the interactive medium and to receive a selection of at least one location from the plurality of locations from the first user; to present the selected advertisement to at least one user within the interactive medium, wherein the at least one user has access to the interactive medium; and to provide a reward to at least the first user, wherein the reward is based on at least the presented selected advertisement; and to track at least one of the selected advertisement, the presented selected advertisement, and the provided reward to generate tracking data for at least one of to bill, to optimize the selection of an advertisement, to optimize the selection of a location, to optimize the creation of a selected advertisement, or to optimize the provided reward.

* * * * *